United States Patent
Jin

(10) Patent No.: US 10,618,399 B2
(45) Date of Patent: Apr. 14, 2020

(54) FRONT-ENGINE EXTENDED RANGE ELECTRIC PASSENGER VEHICLE

(71) Applicant: Technologies' Xanadu of Resonatory-Solar-Systemed Co., Ltd., Beijing (CN)

(72) Inventor: Pu Jin, Beijing (CN)

(73) Assignee: TECHNOLOGIES' XANADU OF RESONATORY-SOLAR-SYSTEMED CO., LTD. (CN)

( * ) Notice: Subject to any disclaimer, the term of this patent is extended or adjusted under 35 U.S.C. 154(b) by 25 days.

(21) Appl. No.: 16/068,964

(22) PCT Filed: Mar. 15, 2016

(86) PCT No.: PCT/CN2016/076387
§ 371 (c)(1),
(2) Date: Jul. 10, 2018

(87) PCT Pub. No.: WO2017/147950
PCT Pub. Date: Sep. 8, 2017

(65) Prior Publication Data
US 2018/0354354 A1    Dec. 13, 2018

(30) Foreign Application Priority Data

Mar. 1, 2016   (CN) .......................... 2016 1 0115067

(51) Int. Cl.
*B60K 6/448*     (2007.10)
*F02C 6/20*      (2006.01)
(Continued)

(52) U.S. Cl.
CPC ............... *B60K 6/448* (2013.01); *B60K 1/04* (2013.01); *B60K 3/04* (2013.01); *B60K 6/24* (2013.01);
(Continued)

(58) Field of Classification Search
CPC .... F02C 6/20; F02C 6/00; B60L 50/61; B60L 50/10; B60L 50/00; B60L 50/60;
(Continued)

(56) References Cited

U.S. PATENT DOCUMENTS

| | | | | |
|---|---|---|---|---|
| 3,868,818 A | * | 3/1975 | Itoh ...................... | F01K 21/047 60/39.15 |
| 4,199,037 A | * | 4/1980 | White ..................... | B60K 3/04 180/65.245 |

(Continued)

FOREIGN PATENT DOCUMENTS

| | | |
|---|---|---|
| CN | 202243043 A | 5/2012 |
| CN | 102658779 A | 9/2012 |

(Continued)

OTHER PUBLICATIONS

Japanese Office Action for Japanese Patent Application No. 2018-536289, drafted Jul. 25, 2019.
(Continued)

*Primary Examiner* — James M Dolak
(74) *Attorney, Agent, or Firm* — Carlson, Gaskey & Olds, P.C.

(57) ABSTRACT

The present disclosure provides a front-engine extended range electric passenger vehicle, including a turbo shaft engine (2), a battery pack (3), an electric generator (4), drive motors (6), a storage tank (9) and an independent regenerator (12), wherein the turbo shaft engine (2) is arranged on frames above a front axle, an axis of an output shaft of the turbo shaft engine (2) is located on a symmetry plane of the vehicle body, and the independent regenerator (12) is located below the turbo shaft engine (2) and is used to preheat inlet air of the turbo shaft engine (2) using exhaust gas discharged therefrom. A combustion gas turbine is adopted in the extended range electric passenger vehicle as power source and arranged at a location at the front axle of the vehicle on (Continued)

a symmetrical center line thereof, an output shaft of the combustion gas turbine is longitudinally arranged, which has advantages of high effective energy conversion, balanced load weight between front and rear wheels as well as left and right wheels, good operating performance and long endurance mileage.

10 Claims, 2 Drawing Sheets

(51) Int. Cl.
| | |
|---|---|
| B60L 58/26 | (2019.01) |
| B60L 50/16 | (2019.01) |
| B60L 50/60 | (2019.01) |
| B60K 6/24 | (2007.10) |
| B60K 3/04 | (2006.01) |
| B60K 1/04 | (2019.01) |
| B60K 6/40 | (2007.10) |
| B60K 7/00 | (2006.01) |

(52) U.S. Cl.
CPC .............. *B60K 6/40* (2013.01); *B60K 7/0007* (2013.01); *B60L 50/16* (2019.02); *B60L 50/60* (2019.02); *B60L 50/66* (2019.02); *B60L 58/26* (2019.02); *F02C 6/20* (2013.01); *B60K 2007/0092* (2013.01); *B60Y 2200/91* (2013.01); *B60Y 2200/92* (2013.01); *B60Y 2300/188* (2013.01); *B60Y 2400/431* (2013.01); *Y02T 10/6295* (2013.01); *Y02T 10/7005* (2013.01); *Y02T 10/7077* (2013.01)

(58) Field of Classification Search
CPC .......... B60L 50/66; B60L 58/10; B60L 58/26; B60K 3/04; B60K 3/00; B60K 7/0007; B60K 7/00; B60K 6/448; B60K 6/00; B60K 6/20; B60K 6/22; B60K 6/24; B60K 6/26; B60K 6/40; B60K 13/02; B60K 13/00; B60K 13/04; B60K 15/03; B60K 15/03006; B60K 1/04; B60K 1/02; B60K 1/00

See application file for complete search history.

(56) References Cited

U.S. PATENT DOCUMENTS

| | | | | |
|---|---|---|---|---|
| 4,270,344 A | * | 6/1981 | Yu ............................. | F02C 3/10 60/791 |
| 4,526,013 A | * | 7/1985 | Joy ........................ | F01K 25/08 62/236 |
| 4,951,769 A | * | 8/1990 | Kawamura .............. | B60K 6/46 180/65.245 |
| 5,482,791 A | | 1/1996 | Shingai et al. | |
| 5,557,919 A | | 9/1996 | Althaus | |
| 5,568,023 A | | 10/1996 | Grayer | |
| 6,213,234 B1 | | 4/2001 | Rosen et al. | |
| 6,450,283 B1 | * | 9/2002 | Taggett ..................... | B60K 3/00 180/304 |
| 7,895,835 B2 | * | 3/2011 | Yaguchi .................. | F02B 73/00 60/285 |
| 8,235,150 B2 | * | 8/2012 | Mustafa ................... | F02B 33/40 123/243 |
| 8,944,015 B2 | * | 2/2015 | Reisser ................... | F01C 9/002 123/18 R |
| 9,494,078 B2 | * | 11/2016 | Kaufman ................. | F02C 3/34 |
| 10,166,872 B2 | * | 1/2019 | Jin .......................... | B60L 50/15 |
| 10,309,364 B2 | * | 6/2019 | Gu ............................. | F01N 5/02 |
| 10,486,514 B2 | * | 11/2019 | Takayanagi ......... | H01M 2/1077 |
| 10,500,937 B2 | * | 12/2019 | Thackwell ............. | B60K 6/365 |
| 10,511,198 B2 | * | 12/2019 | Kano ...................... | B60L 15/20 |
| 2010/0307449 A1 | * | 12/2010 | Reisser ................... | F01C 9/002 123/244 |
| 2011/0239659 A1 | * | 10/2011 | Lior ....................... | B60H 1/004 60/783 |
| 2012/0249061 A1 | | 10/2012 | Watanabe | |
| 2018/0093575 A1 | | 4/2018 | Jin | |

FOREIGN PATENT DOCUMENTS

| | | |
|---|---|---|
| CN | 104786858 A | 7/2015 |
| CN | 104802629 A | 7/2015 |
| CN | 204586535 U | 8/2015 |
| CN | 204605496 U | 9/2015 |
| CN | 205395747 U | 7/2016 |
| GB | 2466081 A | 6/2010 |
| JP | H07150975 A | 6/1995 |
| JP | 2008273316 A | 11/2008 |
| JP | 2015183627 A | 10/2015 |
| WO | 2010020020 A2 | 2/2010 |
| WO | 2011077528 A1 | 6/2011 |

OTHER PUBLICATIONS

European Search Report for European Patent Application No. 16892141.9, dated Sep. 6, 2019.

International Search Report and Written Opinion for International Application No. PCT/CN2016-076387 completed Nov. 10, 2016.

Korean Office Action for Korean Application No. 10-2018-7021610 dated Apr. 29, 2019.

* cited by examiner

FRONT-ENGINE EXTENDED RANGE ELECTRIC PASSENGER VEHICLE

CROSS-REFERENCE TO RELATED APPLICATION

This application is the U.S. national phase of PCT application No. PCT/CN2016/076387 filed on Mar. 15, 2016, which claims priority to Chinese Patent Application No. 201610115067.9 filed on Mar. 1, 2016 entitled "FRONT-ENGINE EXTENDED RANGE ELECTRIC PASSENGER VEHICLE", the disclosure of which is incorporated in its entirety by reference herein.

TECHNICAL FIELD

The present disclosure relates to the field of vehicle technology, and in particular to an extended range electric vehicle in relation to an engine arrangement.

BACKGROUND

Modern vehicles are mainly categorized into several types, including vehicles using conventional piston engines as power source, and electromotor driven vehicles that are pure electric powered and of plug-in type, which using storage batteries for storing energy. Hybrid electric vehicle (HEV) is a new type of vehicle that has two power systems including a conventional piston engine and an electromotor. Existing HEVs generally adopt mechanical hybrid power structures and have two complete power systems including clutches, gearboxes, differential mechanisms and the like, these structures are complex and energy of batteries thereof is so small so as can only serve for driving assistance and braking energy recovery. In contrast, a series type HEV, i.e. an extended range electric vehicle, is driven directly by a motor, structure of which is simple and its batteries are operating in a state of not been fully charged and at excellent voltage platform, this guarantees service life of the batteries. It can also run in a pure electric mode thanks to large battery capacity. Engine thereof is always working in an optimum status with low emission and high efficiency. It also provided with an external charging mode in order to be charged using inexpensive off-peak electricity at night. Generally, existing extended range electric vehicles each uses a piston engine as a charger, and there is a huge difference between thermal efficiency of the piston engine and that of a combustion gas turbine. If using a traditional piston type internal combustion engine as power source, there would be a huge engine structure volume, so that reducing overall efficiency of the power systems in the extended range electric vehicle. Therefore, using a combustion gas turbine to generate electricity for the extended range electric vehicle has a broad application prospect.

Like an ordinary saloon car, in the existing hybrid electric vehicle, the engine is generally placed in the front, that is, the engine is placed at a location in front of a front axle 15. However, due to limitations in characteristics of the piston engine itself, an output shaft of the engine may usually longitudinally arranged, and as a result, it is not easy to achieve a balance of load weight between front and rear wheels as well as left and right wheels, with large moment of inertia and poor controllability.

For a pure electric powered vehicle, middle part of its frames can be used for arranging and installing a battery pack thereto, such that a larger installation space may be acquired to obtain a larger battery capacity. However, for a front-engine extended range electric vehicle, the arranging space of its battery pack is much smaller than that of the pure electric powered vehicle, because of the problems derived from the requirement of balance between front and rear wheels in the case that the engine is placed in the front.

SUMMARY

An object of the present disclosure is to provide a front-engine extended range electric passenger vehicle, in which a combustion gas turbine is adopted as a power source and arranged at a location at the front axle 15 of the vehicle on a symmetrical center line thereof. An output shaft of the combustion gas turbine is longitudinally arranged, which has advantages of high effective energy conversion, balanced load weight between front and rear wheels as well as left and right wheels, good operating performance and long endurance mileage.

A specific technical solution of the present disclosure comprises a front-engine extended range electric passenger vehicle, including a turbo shaft engine, a battery pack, an electric generator, drive motors, a storage tank and an independent regenerator, wherein the turbo shaft engine is arranged on frames 16 above a front axle 15, an axis of an output shaft 2-1 of the turbo shaft engine is located on a symmetry plane 18 of the vehicle body; a rotor of the electric generator and the output shaft 2-1 of the turbo shaft engine are connected to each other; the battery pack is arranged on frames 16 between front and rear axles; the drive motors drive front and rear wheels to rotate; the storage tank is arranged on frames 16 in front of and in vicinity of the rear axle and is configured to store liquefied natural gas, compressed natural gas or fuel oil to be used by the turbo shaft engine; and the independent regenerator is located below the turbo shaft engine, and is used to preheat inlet air of the turbo shaft engine using exhaust gas discharged therefrom.

Optionally, the extended range electric passenger vehicle further includes an intake box and engine exhaust pipes, an air inlet of the turbo shaft engine faces head of the vehicle, the intake box is communicated with the air inlet of the turbo shaft engine and is located behind intake grilles 21 of the head, and two engine exhaust pipes are symmetrically arranged and outlets thereof directly face toward the grilles arranged on front fenders.

Optionally, the extended range electric passenger vehicle further includes a vehicle control unit, a battery controller and a gas controller, the vehicle control unit and the battery controller are located at two sides of the turbo shaft engine respectively, the gas controller is located in front of the storage tank and electrically connected to the vehicle control unit, and the gas controller controls supplement of fuel to a combustion chamber of the turbo shaft engine.

Optionally, the vehicle control unit includes a converter and an inverter, the electric generator is a three-phase high-speed permanent magnet motor, a three-phase output end of the three-phase high-speed permanent magnet motor is connected to a three-phase end of the converter, DC ends of the converter are connected to DC input ends of the battery controller and of the inverter respectively, and a three-phase output end of the inverter is connected to a three-phase end of each of the drive motors.

Optionally, the vehicle control unit includes an inverter, the electric generator consists of both a three-phase AC electric generator and a converter, output ends of the electric generator are connected to DC input ends of the battery controller and of the inverter respectively, and a three-phase output end of the inverter is connected to a three-phase end of each of the drive motors.

Optionally, four drive motors are provided for driving four wheels of the vehicle to rotate respectively.

Optionally, two of the four drive motors are served as hub motors located in the inner side of left and right front wheels respectively.

Optionally, fuel inside the storage tank is compressed natural gas, an anti-freeze relief valve is arranged in front of a compressed natural gas inlet of the turbo shaft engine, the anti-freeze relief valve is heated by a circulation water bath of a battery cooling device, and the heat of the battery cooling device comes from heat radiation of the battery pack and waste heat of the engine exhaust pipes.

Optionally, fuel inside the storage tank is liquefied natural gas, and a supercharging device is arranged in front of a natural gas inlet of the turbo shaft engine.

An advantageous effect of the present disclosure, as compared to the prior arts, is that the front-engine extended range electric passenger vehicle according to the present disclosure has the following advantages:

(1) The electric generator set for providing electric energy according to the present disclosure is a miniature combustion gas turbine and has features of high power-weight ratio, low power consumption, low emission, low noise and vibration, easy maintenance and long lifetime through innovative and optimized efforts of the inventor. The combustion gas turbine further has advantages of extremely large power density, smooth running and low noise. In general, volume of the combustion gas turbine is only one fourth to one fifth of that of a piston engine with equivalent power, this is depended on a continuous thermodynamic cycle nature of the combustion gas turbine itself, and thermal efficiency thereof may even reach up to 30%~60%, which is much higher than the piston engine;

(2) The present disclosure totally eliminates the use of an exhaust gas treatment system. During the entire combustion process of the turbo shaft engine, the combustion process of a four-stroke piston engine is replaced by a continuous and uninterrupted turbo shaft combustion chamber, in which the combustion process will not be interrupted. Further, the combustion chamber has a certain length so as to provide a combustion time that is long enough for completely burning fuel oil, and there is plenty of oxygen therein which is sufficient for an entire oxidation reaction to completely carried out. Therefore, combustion emission structure in the turbo shaft engine is greatly superior to the conventional piston engine, and is approximately 40% of the Euro 6 emission standard. Meanwhile, it is avoided to provide a whole set of exhaust gas treatment system like that in the piston engine and therefore unnecessary to maintain and repair any exhaust gas treatment system. As a result, environmental pollution due to failure of exhaust gas treatment system of the vehicle may also be prevented, thus fundamentally achieve improvement in emission level and improve the environmental protection performance;

(3) The miniature turbo shaft engine is placed in the front, the air inlet thereof faces toward head of the vehicle, which shortens air intake length and improves air intake efficiency. In addition, the intake box is presented in front of the air inlet, which is capable of rapidly and sufficiently supplying the turbo shaft engine with air to satisfy the usage requirements;

(4) The miniature turbo shaft engine is placed in the front, and the output shaft thereof is located on a symmetrical center plane of the vehicle, so that load is evenly distributed between the left and right wheels, such that improves steering controllability of the vehicle. In addition, the battery pack is arranged just behind the middle part of the vehicle and the storage tank is arranged at the rear part of the vehicle, so that has an ideal and balanced weight distribution on the front and rear wheels as well as a smaller inertia moment in a horizontal direction during high speed driving, therefore the vehicle has advantages of good controllability and sharp steering, and has weak phenomenon of head-down and tail-up when braking;

(5) An inlet air preheating device of the turbo shaft engine, i.e. the independent regenerator is arranged externally and installed below the turbo shaft engine, so that a volume of the turbo shaft engine is reduced without reducing the efficiency of the turbo shaft engine, which makes it possible to arrange the turbo shaft engine in a narrow and small space at the head;

(6) If the vehicle still adopts an ordinary linear arrangement of the miniature turbo shaft engine and the electric generator, that is, an arrangement in which an air inlet, a compressor, a burner, a turbine and an engine behind the turbine's output shaft are arranged in a straight line, then in this case will give rise to an excessive demand on the arranging space, which cannot meet the arranging requirement of the passenger vehicle. Therefore, arranging the electric generator at the air inlet of the miniature turbo shaft engine may significantly reduce the entire installation size of the miniature turbo shaft engine and the electric generator;

(7) Arranging the engine in the front allows the battery pack to have a larger arranging space without occupying the arranging space of the engine and thus a battery pack with a larger capacity can be arranged in the vehicle, since an extended-range mode is adopted, wherein electric energy is transmitted to the drive motors of the front and rear wheels by the electric generator using cables such that eliminate any unnecessary clutch and speed changing devices and rotating shafts. Moreover, the engine may be installed directly on the frames without being arranged above the battery pack, which allows a more secure installation and a lower center of gravity, so as to facilitate the controllability of the vehicle; and (8) The four wheels are driven and controlled independently after arranging the engine in the front, such that load on each of the driving wheels is increased when the vehicle is starting up, accelerating or climbing on a good performance road surface, so as to enable the vehicle with an excellent traction performance. In addition, because the axle load distribution is relatively even in the vehicle, it has good stability and ride comfort as well as long service life of tires.

DETAILED DESCRIPTION

The technical solution of the present invention will be further described below in conjunction with the accompanying drawings.

Figure 1:
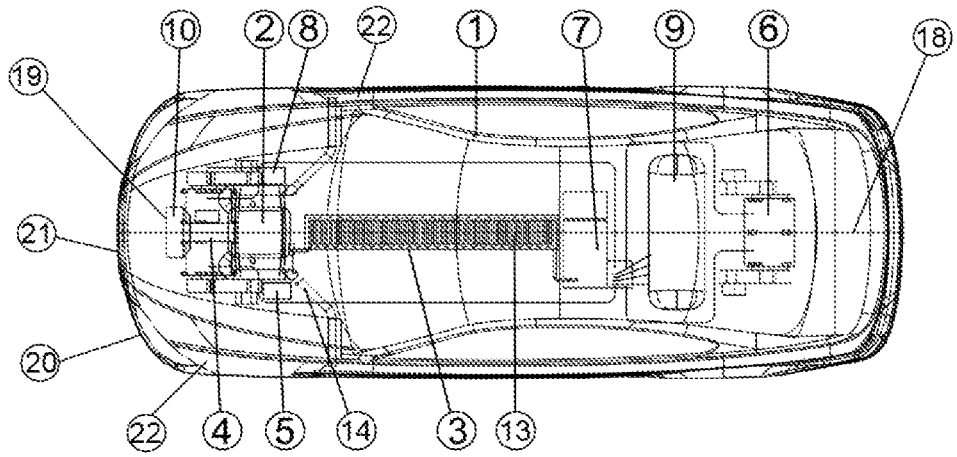
FIG. 1 is a top view of a front-engine extended range electric passenger vehicle according to the present disclosure.
Figure 2:
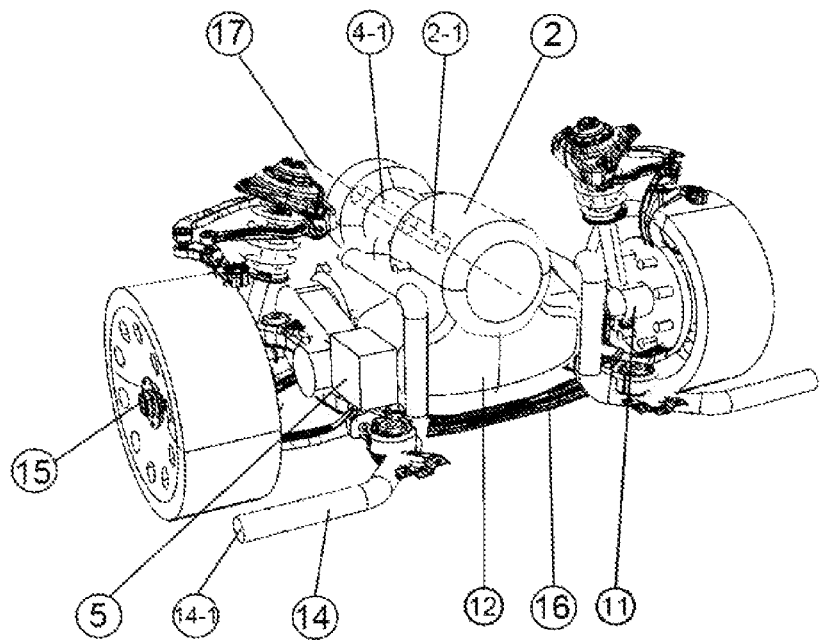
FIG. 2 is a perspective view of a portion of head of the front-engine extended range electric passenger vehicle according to the present disclosure seen from tail of the vehicle to the head.
Figure 3:
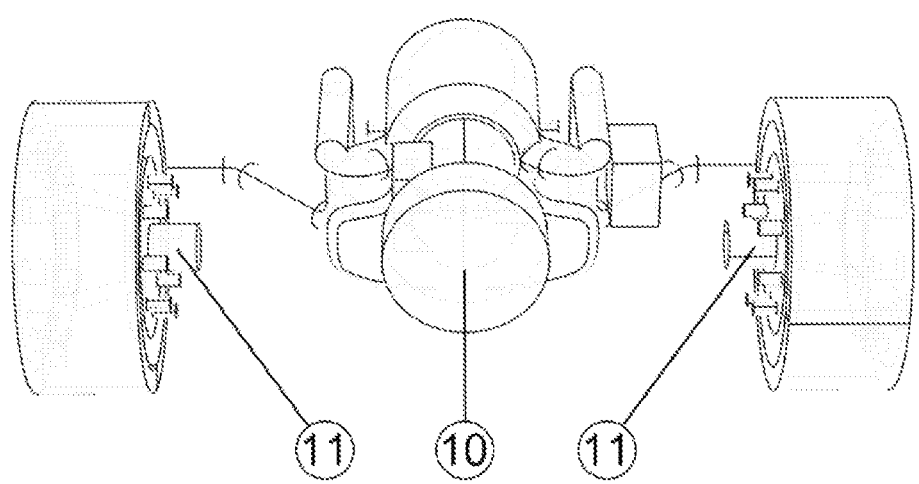
FIG. 3 is a perspective view of the portion of the head of the front-engine extended range electric passenger vehicle according to the present disclosure seen from the head to the tail of the vehicle.

As shown in FIG. 1 to FIG. 3, a front-engine extended range electric passenger vehicle according to the present disclosure includes a vehicle body 1, a turbo shaft engine 2, a battery pack 3, an electric generator 4, a vehicle control unit 5, drive motors 6, a gas controller 7, a battery controller 8, a storage tank 9, an intake box 10, hub motors 11, an independent regenerator 12, a battery cooling device 13 and engine exhaust pipes 14.

The vehicle body 1 adopts an integral body structure and bottom structure thereof forms frames of the vehicle directly. The turbo shaft engine 2 is arranged on the frames above a front axle 15, and an axis of an output shaft 17 of the turbo shaft engine 2 is located on a symmetry plane of the vehicle body.

An air inlet 19 of the turbo shaft engine 2 faces toward head of the vehicle, and the intake box 10 is communicated with the air inlet 19 and located behind intake grilles 21 of the head. Two engine exhaust pipes 14 are symmetrically arranged and outlets 14-1 thereof directly face toward the grilles arranged on front fenders 22.

A rotor 4-1 of the electric generator 4 and the output shaft of the turbo shaft engine 2 are connected to each other.

The battery pack 3 is arranged on the frames between front and rear axles.

Four drive motors 6 are provided, wherein two of which are symmetrically arranged on the frames in the inner side of two rear wheels to drive the rear wheels to rotate respectively. The other two are served as the hub motors 11 located in the inner side of left and right front wheels respectively.

The storage tank 9 is arranged and installed on the frames in front of and in vicinity of the rear axle, and the storage tank 9 is configured to store liquefied natural gas, compressed natural gas, gasoline or diesel oil to be used by the turbo shaft engine 2.

The independent regenerator 12 is located below the turbo shaft engine 2 and is used to preheat inlet air of the turbo shaft engine 2 using exhaust gas discharged therefrom.

In the case that the fuel inside the storage tank 9 is compressed natural gas, an anti-freeze relief valve is arranged in front of a compressed natural gas inlet of the turbo shaft engine 2. The anti-freeze relief valve is heated by a circulation water bath of the battery cooling device 13, and the heat of the battery cooling device 13 comes from heat radiation of the battery pack 3 and waste heat of the engine exhaust pipes 14.

In the case that the fuel inside the storage tank 9 is liquefied natural gas, a supercharging device is arranged in front of a natural gas inlet of the turbo shaft engine 2.

The electric vehicle according to the present disclosure may adopt two kinds of energy systems, i.e., a compressed natural gas (CNG) system and a liquefied natural gas (LNG) system. For the CNG system, the storage tank 9 will be a high pressure vessel, with a storage pressure of 20 MPa. The storage tank 9 is connected to a natural gas inlet of the engine via a pipeline, and an anti-freeze relief valve is arranged in front of the natural gas inlet. For the LNG system, the storage tank 9 will be a thermal insulation tank, a thermal valve is opened when the engine needs to suck in air, such as to vaporize liquefied gas after heat absorption of the gas and pressurize the gas to 0.5 MPa using a supercharger. Heat supply amount of the thermal valve is electrical controlled.

The vehicle control unit 5 and the battery controller 8 are located at two sides of the turbo shaft engine 2 respectively. In addition to controlling a steering system and a braking system of the vehicle, the vehicle control unit 5 further allocates torques of the four drive motors 6 via the motor controller to control a traveling system of the vehicle, and connects to the gas controller 7 of the turbo shaft engine 2 to control supplement of gas of the combustion chamber of the turbo shaft engine 2 so as to change power output of the turbo shaft engine 2. The gas controller 7 is located in front of the storage tank 9.

The vehicle control unit 5 is further connected to a control end of the battery controller 8. According to a specific embodiment of the present disclosure, the vehicle control unit 5 includes a converter and an inverter, the electric generator 4 is a three-phase high-speed permanent magnet motor, and a bearing of the electric generator 4 is an air bearing. A three-phase output end of the three-phase high-speed permanent magnet motor is connected to a three-phase end of the converter, DC ends of the converter are connected to DC input ends of the battery controller 8 and of the inverter respectively, and a three-phase output end of the inverter is connected to a three-phase end of each of the drive motors 6. When the turbo shaft engine 2 stars up, the battery pack 3 drives the electric generator 4 to rotate via the battery controller 8 and the converter, so that the turbo shaft engine 2 acquires a rotate speed for initial starting. According to another embodiment, the vehicle control unit 5 includes a inverter, and the electric generator 4 is a DC brushless generator consists of both a three-phase AC generator and a converter, wherein output ends of the brushless generator are respectively connected to DC input ends of the battery controller 5 and of the inverter, and a three-phase output end of the inverter is connected to a three-phase end of each of the drive motors 6.

The electric generator 4 mainly provides electricity for the vehicle, and the energy is fed in two separate directions, that is, flows to the battery pack 3 and to the drive motors 6, this means that the turbo shaft engine 2 may individually charge the battery pack 3 without supplying the drive motors 6 with electric energy; or the electric generator 4 transmits electric energy at rated power to the drive motors 6 and the battery pack 3 simultaneously based on an electrical control proportion (calculated and controlled by a central control circuit of the vehicle control unit 5). Even in the case that the battery pack 3 has no electric energy storage at all and maximum powers are required for use of the drive motors 6, the electric generator 4 is fully able to supply all electric energy to the drive motors 6 without charge the batteries for the moment so as to guarantee a maximum power performance. Therefore, the extended range electric vehicle according to the present disclosure has the following several operating modes.

Mode 1: Static charging mode, that is, in a state that the drive motors 6 are not in operation and the vehicle is stopped, the electric generator 4 slowly or quickly charges the battery pack 3 by the control of the central control circuit of the vehicle control unit 5 (depending on requirements of a user).

Mode 2: Moving charging mode, that is, in the case that the drive motors 6 are working at standard powers and the electric generator 4 supplies the battery pack 3 with electricity, when the working powers of the drive motors 6 are elevated to be ultra-high, the electric generator 4 and the battery pack 3 supply the drive motors 6 with electricity simultaneously to instantaneously exhibit an extremely high vehicle performance.

Mode 3: If the batteries have been completely discharged but still requires a high-performance running (e.g. in road condition of expressway), then the electric generator 4 drives the electric motors at a high power of 30-60 kW and provides a running velocity of 150-200 km/h without charging the battery pack 3; as soon as the energy consumption is reduced during the running, the vehicle is switched into mode 2 automatically, and then switched into mode 1 automatically after it is stopped.

What is claimed is:

1. A front-engine extended range electric passenger vehicle, comprising a turbo shaft engine, a battery pack, an electric generator, drive motors, a storage tank and an independent regenerator, wherein
   the turbo shaft engine is arranged on a first section of a vehicle frame above a front axle, and an axis of an output shaft of the turbo shaft engine is located on a symmetry plane of a body of the vehicle,
   a rotor of the electric generator and the output shaft of the turbo shaft engine are connected to each other,
   the battery pack is arranged on a first section of a vehicle frame between the front axle and a rear axle of the vehicle,
   the drive motors drive front and rear wheels to rotate,
   the storage tank is arranged on a first section of a vehicle frame in front of and in vicinity of the rear axle, and the storage tank is for storing liquefied natural gas compressed natural gas or fuel oil to be used by the turbo shaft engine, and
   the independent regenerator is located below the turbo shaft engine and is used to preheat inlet air of the turbo shaft engine using exhaust gas discharged from the turbo shaft engine.

2. The front-engine extended range electric passenger vehicle according to claim 1, wherein the extended range electric passenger vehicle further comprises an intake box and engine exhaust pipes, an air inlet of the turbo shaft engine is arranged so that the air inlet opens to face a front portion of the vehicle, the intake box is communicated with the air inlet and located behind intake grilles of the front portion of the vehicle, and wherein the engine exhaust pipes comprise two engine exhaust pipes that are symmetrically arranged on two sides of the turbo shaft engine and outlets of the exhaust pipes open to directly face toward the intake grilles arranged on front fenders.

3. The front-engine extended range electric passenger vehicle according to claim 1, wherein the extended range electric passenger vehicle further comprises a vehicle control unit, a battery controller and a gas controller, the vehicle control unit and the battery controller are located at two sides of the turbo shaft engine respectively, the gas controller is located in front of the storage tank and electrically connected to the vehicle control unit, and the gas controller controls supplement of fuel to a combustion chamber of the turbo shaft engine.

4. The front-engine extended range electric passenger vehicle according to claim 3, wherein the vehicle control unit comprises a converter and an inverter, the electric generator is a three-phase high-speed permanent magnet motor, a three-phase output end of the three-phase high speed permanent magnet motor is connected to a three-phase end of the converter, DC ends of the converter are connected to DC input ends of the battery controller and of the inverter respectively, and a three-phase output end of the inverter is connected to a three-phase end of each of the drive motors.

5. The front-engine extended range electric passenger vehicle according to claim 3, wherein the vehicle control unit comprises an inverter, the electric generator consists of both a three-phase AC electric generator and a converter, output ends of the electric generator are connected to DC input ends of the battery controller and of the inverter respectively, and a three-phase output end of the inverter is connected to a three-phase end of each of the drive motors.

6. The front-engine extended range electric passenger vehicle according to claim 1, wherein the drive motors comprise four drive motors that are provided to drive the four wheels of the front and rear wheels to rotate respectively.

7. The front-engine extended range electric passenger vehicle according to claim 6, wherein two of the four drive motors are hub motors located in the inner side of left and right front wheels respectively.

8. The front-engine extended range electric passenger vehicle according to claim 2, wherein fuel inside the storage tank is compressed natural gas, an anti-freeze relief valve is arranged in front of a compressed natural gas inlet of the turbo shaft engine, the anti-freeze relief valve is heated by a circulation water bath of a battery cooling device, and the heat of the battery cooling device comes from heat radiation of the battery pack and waste heat of the engine exhaust pipes.

9. The front-engine extended range electric passenger vehicle according to claim 1, wherein fuel inside the storage tank is liquefied natural gas, and a supercharging device is arranged in front of a natural gas inlet of the turbo shaft engine.

10. A front-engine extended range electric passenger vehicle, comprising a turbo shaft engine, a battery pack, an electric generator, drive motors, a storage tank and an independent regenerator, wherein
    the turbo shaft engine is arranged on a first section of a vehicle frame above a front axle, and an axis of an output shaft of the turbo shaft engine is located on a symmetry plane of a body of the vehicle,
    a rotor of the electric generator and the output shaft of the turbo shaft engine are connected to each other,
    the battery pack is arranged on a first section of a vehicle frame between the front axle and a rear axle of the vehicle,
    the drive motors drive front and rear wheels to rotate,
    the storage tank is arranged on a first section of a vehicle frame in front of and in vicinity of the rear axle, and the storage tank is for storing liquefied natural gas, compressed natural gas or fuel oil to be used by the turbo shaft engine,
    the independent regenerator is located below the turbo shaft engine and is used to preheat inlet air of the turbo shaft engine using exhaust gas discharged from the turbo shaft engine,
    wherein the extended range electric passenger vehicle further comprises an intake box and engine exhaust pipes, an air inlet of the turbo shaft engine is arranged so that the air inlet opens to face a front portion of the vehicle, the intake box is communicated with the air inlet and located behind intake grilles of the front portion of the vehicle, and the engine exhaust pipes comprise two engine exhaust pipes that are symmetrically arranged on two sides of the turbo shaft engine and outlets of the exhaust pipes open to directly face toward the intake grilles arranged on front fenders,
    wherein the extended range electric passenger vehicle further comprises a vehicle control unit, a battery controller and a gas controller, the vehicle control unit and the battery controller are located at two sides of the turbo shaft engine respectively, the gas controller is located in front of the storage tank and electrically connected to the vehicle control unit, and the gas controller controls supplement of fuel to a combustion chamber of the turbo shaft engine, wherein the vehicle control unit comprises either (1) a converter and an inverter, the electric generator is a three-phase high-speed permanent magnet motor, a three-phase output end of the three-phase high speed permanent magnet motor is connected to a three-phase end of the converter, DC ends of the converter are connected to DC input ends of the battery controller and of the inverter respectively, and a three-phase output end of the inverter is connected to a three-phase end of each of the drive motors, or (2) an inverter, the electric generator consists of both a three-phase AC electric generator and a converter, output ends of the electric generator are connected to DC input ends of the battery controller and of the inverter respectively, and a three-phase output end of the inverter is connected to a three-phase end of each of the drive motors, the drive motors comprise four drive motors that are provided to drive the four wheels of the front and rear wheels to rotate respectively, wherein two of the four drive motors are hub motors located in the inner side of left and right front wheels respectively, and wherein either (1) fuel inside the storage tank is compressed natural gas, an antifreeze relief valve is arranged in front of a compressed natural gas inlet of the turbo shaft engine, the anti-freeze relief valve is heated by a circulation water bath of a battery cooling device, and the heat of the battery cooling device comes from heat radiation of the battery pack and waste heat of engine exhaust pipes, or (2) fuel inside the storage tank is liquefied natural gas, and a supercharging device is arranged in front of a natural gas inlet of the turbo shaft engine.

* * * * *